(12) United States Patent  
Patel et al.

(10) Patent No.: US 8,702,854 B2
(45) Date of Patent: Apr. 22, 2014

(54) AZAPHTHALOCYANINES AND THEIR USE IN INK-JET PRINTING

(75) Inventors: Prakash Patel, Manchester (GB); Toshiki Fujiwara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 258 days.

(21) Appl. No.: 13/133,350

(22) PCT Filed: Nov. 26, 2009

(86) PCT No.: PCT/GB2009/051604
§ 371 (c)(1),
(2), (4) Date: Jun. 7, 2011

(87) PCT Pub. No.: WO2010/070313
PCT Pub. Date: Jun. 24, 2010

(65) Prior Publication Data
US 2011/0234687 A1 Sep. 29, 2011

(30) Foreign Application Priority Data
Dec. 20, 2008 (GB) .................... 0823267.0

(51) Int. Cl.
*C09D 11/02* (2006.01)
*C09B 47/067* (2006.01)

(52) U.S. Cl.
USPC ............ 106/31.47; 106/31.49; 540/124; 540/125; 540/126; 540/133

(58) Field of Classification Search
USPC .......... 106/31.47, 31.49; 540/124, 125, 126, 540/133, 134; 428/195.1; 347/100
See application file for complete search history.

(56) References Cited

U.S. PATENT DOCUMENTS

| | | | | |
|---|---|---|---|---|
| 5,322,760 A * | 6/1994 | Itoh et al. ................. | 540/126 |
| 7,097,701 B2 * | 8/2006 | Tateishi et al. ............ | 106/31.49 |
| 7,132,012 B2 * | 11/2006 | Tateishi et al. ............ | 106/31.49 |
| 7,544,236 B2 * | 6/2009 | Mayall et al. ............. | 106/31.49 |
| 7,566,362 B2 * | 7/2009 | Mori et al. ................ | 106/31.47 |
| 7,585,361 B2 * | 9/2009 | Yoneda et al. ............ | 106/31.47 |
| 7,591,888 B2 * | 9/2009 | Fujii et al. ................ | 106/31.47 |
| 7,854,797 B2 | 12/2010 | Fujii et al. ................ | 106/31.47 |
| 8,038,782 B2 * | 10/2011 | Tateishi et al. ............ | 106/31.49 |
| 2006/0201382 A1 * | 9/2006 | Ozawa et al. ............ | 106/31.49 |
| 2008/0130474 A1 * | 6/2008 | Schmidhalter et al. .... | 369/275.1 |
| 2009/0121599 A1 | 5/2009 | Laible ..................... | 312/404 |
| 2010/0112218 A1 | 5/2010 | Fujii et al. ................ | 427/256 |
| 2010/0279082 A1 | 11/2010 | Shimizu et al. ........... | 428/195.1 |
| 2011/0143106 A1 | 6/2011 | Patel ....................... | 428/195.1 |
| 2012/0081482 A1 * | 4/2012 | Dunwoody et al. ......... | 540/126 |
| 2012/0188317 A1 * | 7/2012 | Patel ....................... | 347/100 |
| 2012/0218343 A1 * | 8/2012 | Patel ....................... | 106/31.49 |

FOREIGN PATENT DOCUMENTS

| | | | |
|---|---|---|---|
| EP | 1 741 756 | 1/2007 | ............. C09B 47/00 |
| EP | 1 985 668 | 10/2008 | ............. C09B 47/00 |
| JP | 2004-75986 | 3/2004 | ............. C09D 11/00 |
| WO | WO 02/34844 | 5/2002 | ............. C09D 11/00 |
| WO | WO 2005/000972 | 1/2005 | ............. C09B 47/00 |

OTHER PUBLICATIONS

International Search Report and Written Opinion issued Jul. 7, 2010, in PCT Application No. PCT/GB2009/051604.

* cited by examiner

*Primary Examiner* — Helene Klemanski
(74) *Attorney, Agent, or Firm* — Sughrue Mion, PLLC

(57) ABSTRACT

Azaphthalocyanine compounds of Formula (1) and salts thereof: wherein: MAzPc represents a azaphthalocyanine nucleus of formula (A): M is 2H, Cu or Ni; each P is independently CH or N; $R^1$, $R^2$ are independently H or optionally substituted alkyl; $R^3$ is optionally substituted hydrocarbyl; y is greater than 0 and less than 4; z is greater than 0 and less than 4; and the sum of y+z is in the range of from 1 to 4; 15 provided that at least one P is N in any one of the four component rings of the azaphthalocyanine nucleus. Also compositions, inks, printing processes, printed materials and ink-jet cartridges.

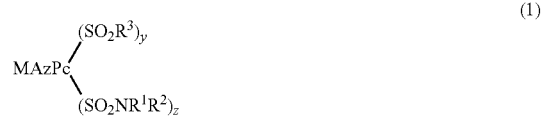

(1)

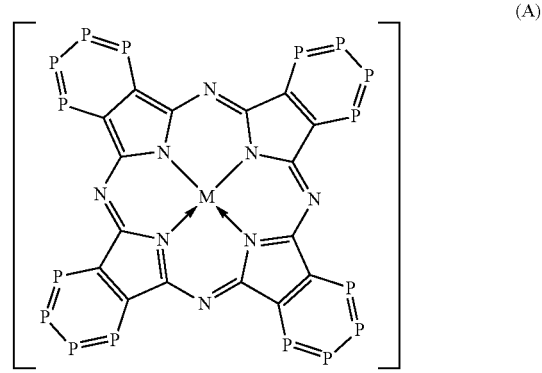

(A)

12 Claims, No Drawings

AZAPHTHALOCYANINES AND THEIR USE IN INK-JET PRINTING

This application is a 371 filing based on PCT/GB2009/051604, filed Nov. 26, 2009, which claims priority to United Kingdom Application No. 0823267.0, filed Dec. 20, 2008, both of which are hereby incorporated by reference in their entirety.

This invention relates to compounds, compositions and inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate. The set of inks used in this technique typically comprise yellow, magenta, cyan and black inks.

With the advent of high-resolution digital cameras it is becoming increasingly common for consumers to print off photographs using an ink-jet printer. This avoids the expense and inconvenience of conventional silver halide photography.

While ink-jet printers have many advantages over other forms of printing and image development there are still technical challenges to be addressed. For example, there are the contradictory requirements of providing ink colorants that are soluble in the ink medium and yet display excellent wetfastness (i.e. prints do not run or smudge when printed). The inks also need to dry quickly to avoid sheets sticking together after they have been printed, but they should not form a crust over the tiny nozzle used in the printer. Storage stability is also important to avoid particle formation that could block the tiny nozzles used in the printer especially since consumers can keep an ink-jet ink cartridge for several months. Furthermore, and especially important with photographic quality reproductions, the resultant images should not bronze or fade rapidly on exposure to light or common oxidising gases such as ozone. It is also important that the shade and chroma of the colorant are exactly right so that any image may be optimally reproduced.

Thus developing new colorants for ink-jet printing presents a unique challenge in balancing all these conflicting and demanding properties.

The present invention provides azaphthalocyanine compounds of Formula (1) and salts thereof:

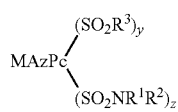

Formula (1)

wherein:

MAzPc represents an azaphthalocyanine nucleus of formula

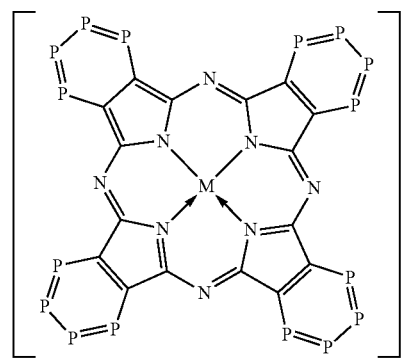

M is 2H, Cu or Ni;
each P is independently CH or N;

$R^1$, $R^2$ are independently H or optionally substituted alkyl;
$R^3$ is optionally substituted hydrocarbyl;
y is greater than 0 and less than 4;
z is greater than 0 and less than 4; and
the sum of y+z is in the range of from 1 to 4;
provided that at least one P is N in any one of the four component rings of the azaphthalocyanine nucleus.

M is preferably Cu or Ni and more preferably Cu.

Preferably $R^1$ is H or optionally substituted $C_{1-4}$ alkyl. More preferably $R^1$ is H or methyl, especially H.

More preferably $R^2$ is H or optionally substituted $C_{1-8}$alkyl especially $C_{1-8}$alkyl substituted with 1 or more substituents selected from; water solubilising groups, optionally substituted heteroaryl or optionally substituted phenyl.

It is particularly preferred that $R^2$ is H; optionally substituted $C_{1-4}$alkyl carrying 1 or 2, particularly 2, water solubilising groups selected from the group consisting of —$SO_3H$, —$CO_2H$ and —$PO_3H_2$; optionally substituted $C_{1-4}$alkyl carrying an optionally substituted heteroaryl group (where preferably the heteroaryl group or substituent thereof carries at least one water solubilising group selected from the group consisting of —$SO_3H$, —$CO_2H$ and —$PO_3H_2$); or optionally substituted $C_{1-4}$alkyl carrying an optionally substituted aryl group (where preferably the aryl group or substituent thereof carries at least one water solubilising group selected from the group consisting of —$SO_3H$, —$CO_2H$ and —$PO_3H_2$).

It is especially preferred that $R^2$ is optionally substituted $C_{1-4}$alkyl carrying an optionally substituted triazinyl (where preferably the triazinyl group or substituent thereof carries at least one water solubilising group selected from the group consisting of —$SO_3H$, —$CO_2H$ and —$PO_3H_2$).

Preferably the optionally substituted triazinyl substituent on $R^2$, when it is optionally substituted $C_{1-4}$alkyl, is a group of Formula (2)

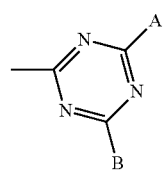

Formula (2)

wherein:
A is selected from the group consisting of —$OR^4$, —$SR^5$, —$NR^4R^5$;
B is selected from the group consisting of —$OR^6$, —$SR^7$, —$NR^6R^7$;
$R^4$, $R^5$, $R^6$ and $R^7$ are independently H, optionally substituted alkyl, optionally substituted aryl or optionally substituted heterocyclyl provided that at least one of the groups represented by $R^4$, $R^5$, $R^6$ and $R^7$ carries at least one substituent selected from the group consisting of —$SO_3H$, —$CO_2H$ and —$PO_3H_2$.

Preferred groups represented by A and B may be independently selected from the group consisting of —OH, —$NHCH_3$, —$N(CH_3)_2$, —$NHC_2H_4SO_3H_2$, —$N(CH_3)C_2H_4SO_3H_2$, —$NC_3H_6SO_3H$, —NHdisulfophenyl, —NHsulfophenyl, —NHcarboxyphenyl or —NHdicarboxyphenyl, —NHsulfonaphthyl, —NHdisulfonaphthyl, —NHtrisulfonaphthyl, —NHcarboxynaphthyl, NHdicarboxynaphthyl, NHtricarboxynaphthyl-NHsulfoheterocyclyl, —NHdisulfoheterocyclyl or —NHtrisulfoheterocyclyl.

More preferably the optionally substituted triazinyl substituent on $R^2$, when it is optionally substituted $C_{1-4}$alkyl, comprises a group of Formula (3)

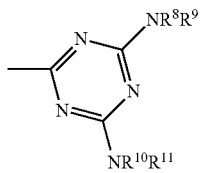

Formula (3)

wherein:
$R^8$ is H or optionally substituted $C_{1-4}$alkyl;
$R^9$ is H or optionally substituted $C_{1-4}$alkyl;
$R^{10}$ is H or optionally substituted $C_{1-4}$alkyl;
$R^{11}$ is optionally substituted alkyl, optionally substituted aryl or optionally substituted heterocyclyl carrying at least one substituent selected from the group consisting of —$SO_3H$, —$CO_2H$ and —$PO_3H_2$.
Preferably $R^8$ is H or unsubstituted $C_{1-4}$alkyl, more preferably $R^8$ is H or methyl especially H.
Preferably $R^9$ is H or unsubstituted $C_{1-4}$alkyl, more preferably $R^9$ is H or methyl especially H.
Preferably $R^{10}$ is H or unsubstituted $C_{1-4}$alkyl, more preferably $R^{10}$ is H or methyl especially H.
In a preferred embodiment $R^8$, $R^9$ and $R^{10}$ are all independently either H or methyl, more preferably $R^8$, $R^9$ and $R^{10}$ are all H.
Preferably $R^{11}$ is optionally substituted aryl carrying at least one substituent selected from the group consisting of —$SO_3H$, —$CO_2H$ and —$PO_3H_2$. More preferably $R^{11}$ is an aryl group (particularly a phenyl group) carrying 1 to 3, especially 2, —$SO_3H$ or —$CO_2H$ groups.
Preferably the triazinyl groups of Formula (2) or Formula (3) are linked to the alkyl group of $R^2$ by a group of formula

—$NR^{12}$— wherein $R^{12}$ is H or optionally substituted $C_{1-4}$alkyl.
Preferably $R^{12}$ is H or methyl, more preferably H.
Thus $R^2$ is most preferably a group of Formula (4)

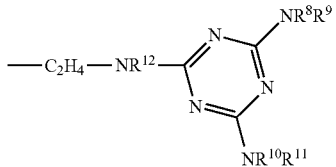

Formula (4)

wherein:
$R^8$ is H or optionally substituted $C_{1-4}$alkyl;
$R^9$ is H or optionally substituted $C_{1-4}$alkyl;
$R^{10}$ is H or optionally substituted $C_{1-4}$alkyl;
$R^{11}$ is optionally substituted alkyl, optionally substituted aryl or optionally substituted heterocyclyl carrying at least one substituent selected from the group consisting of —$SO_3H$, —$CO_2H$ and —$PO_3H_2$; and
$R^{12}$ is H or optionally substituted $C_{1-4}$alkyl.
Preferably $R^8$ is H or unsubstituted $C_{1-4}$alkyl, more preferably $R^8$ is H or methyl especially H.
Preferably $R^9$ is H or unsubstituted $C_{1-4}$alkyl, more preferably $R^9$ is H or methyl especially H.

Preferably $R^{10}$ is H or unsubstituted $C_{1-4}$alkyl, more preferably $R^{10}$ is H or methyl especially H.
In a preferred embodiment $R^8$, $R^9$ and $R^{10}$ are all independently either H or methyl, more preferably $R^8$, $R^9$ and $R^{10}$ are all H.
Preferably $R^{11}$ is optionally substituted aryl carrying at least one substituent selected from the group consisting of —$SO_3H$, —$CO_2H$ and —$PO_3H_2$. More preferably $R^{11}$ is an aryl group (particularly a phenyl group) carrying 1 to 3, especially 2, —$SO_3H$ or —$CO_2H$ groups.
Preferably $R^{12}$ is H or methyl, more preferably H.
Preferably $R^3$ is optionally substituted alkyl, optionally substituted heterocyclyl or optionally substituted aryl.
More preferably $R^3$ is optionally substituted alkyl, especially optionally substituted $C_{1-8}$ alkyl, optionally interrupted by one or more hetero atoms.
It is particularly preferred that —$SO_2R^3$ is a group of Formula (5)

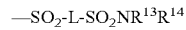—$SO_2$-L-$SO_2NR^{13}R^{14}$        Formula (5)

wherein:
$R^{13}$ is H or optionally substituted $C_{1-4}$alkyl;
$R^{14}$ is H or optionally substituted $C_{1-4}$alkyl; and
L is optionally substituted $C_{1-4}$alkylene.
Preferably $R^{13}$ is H or methyl. More preferably $R^{13}$ is H.
Preferably $R^{14}$ is $C_{1-4}$alkyl carrying at least one substituent selected from the group consisting of —OH, —$SO_3H$, —$CO_2H$ and —$PO_3H_2$.
L is preferably unsubstituted alkylene, more preferably L is a group of formula —$CH_2CH_2$—.
Preferably y is 0.1 to 3, and especially 0.2 to 2.0.
Preferably z is 0.1 to 3, and especially 0.2 to 2.0.
The sum of (y+z) is preferably 1 to 3.
It is especially preferred that the sum of (y+z) is 3.
Preferably only one P is N in any one of the four component rings of the azaphthalocyanine nucleus.
Preferred optional substituents which may be present on any one of L, $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ are independently selected from: optionally substituted alkoxy (preferably $C_{1-4}$-alkoxy), optionally substituted aryl (preferably phenyl), optionally substituted aryloxy (preferably phenoxy), optionally substituted heterocyclyl, polyalkylene oxide (preferably polyethylene oxide or polypropylene oxide), phosphato, nitro, cyano, halo, ureido, hydroxy, ester, —$NR^aR^b$, —$COR^a$, —$CONR^aR^b$, —NH-$COR^a$, carboxyester, sulfone, and —$SO_2NR^aR^b$, wherein $R^a$ and $R^b$ are each independently H, optionally substituted alkyl (especially $C_{1-4}$-alkyl), optionally substituted aryl or optionally substituted heteroaryl. When $R^3$, $R^4$, $R^5$, $R^6$, $R^7$ and $R^{11}$ comprise a cyclic group they may also carry an optionally substituted alkyl (especially $C_{1-4}$-alkyl) substituent. Optional substituents for any of the substituents described for L, $R^1$, $R^2$, $R^3$, $R^4$, $R^5$, $R^6$, $R^7$, $R^8$, $R^9$, $R^{10}$, $R^{11}$, $R^{12}$, and $R^{13}$ may be selected from the same list of substituents.
The compounds of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the compounds of Formula (1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endomethylene cyclohexane carboxylic acids. Other examples of cellulose reactive groups are tetrafluorocyclobutyl carbonyl, trifluorocyclobutenyl carbonyl, tetrafluorocyclobutylethenyl carbonyl, trifluorocyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide.

Acid or basic groups on the compounds of Formula (1), particularly acid groups, are preferably in the form of a salt. Thus, all Formulae shown herein include the compounds in salt form.

Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. Compounds of Formula (1) may be converted into a salt using known techniques.

The compounds of Formula (1) may exist in tautomeric forms other than those shown in this specification. These tautomers are included within the scope of the present invention.

The compounds of Formula (1) have attractive, strong shades and are valuable colorants for use in the preparation of ink-jet printing inks (especially cyan inks). They benefit from a good balance of solubility, storage stability and fastness to water, ozone and light. In particular they display excellent wet fastness and ozone fastness.

The compounds of Formula (1) may be prepared by any method known in the art, and particularly by any method which comprises cyclisation of a optionally substituted phthalic acid, optionally substituted phthalonitrile, optionally substituted iminoisoindoline, optionally substituted phthalic anhydride, optionally substituted phthalimide or optionally substituted phthalamide (or analogue thereof) with an optionally substituted nitrogen heteroaryl dicyano or dicarboxylic acid in the presence of a suitable nitrogen source (if required), a metal salt, such as $CuCl_2$, (if required) and a base such as 1,8-diazabicyclo[5.4.0]undec-7-ene (DBU).

Preferably the compounds of Formula (1) are obtainable by a process which comprises a cyclisation step wherein an azaphthalonitrile is reacted with a phthalonitrile carrying a $—SO_2NR^1R^2$ substituent and a phthalonitrile carrying a $—SO_2R^3$ substituent, wherein $R^1$, $R^2$ and $R^3$ are as defined, and preferred, above.

Compounds such as, for example, a phthalonitrile carrying a substituent such as those described above for $—SO_2NR^1R^2$ and $—SO_2R^3$ may be prepared by methods known in the art such as those described in U.S. Pat. No. 7,211,134 which is incorporated herein by reference.

A skilled person will appreciate that the product of these reactions will be a disperse mixture and so the values of y and z will represent an average of the groups present in the mixture.

According to a second aspect of the present invention there is provided a composition comprising azaphthalocyanine compounds of Formula (1) and salts thereof, as described in the first aspect of the invention, and a liquid medium.

Preferred compositions according to the second aspect of the invention comprise:
(a) from 0.01 to 30 parts of azaphthalocyanine compounds or Formula (1) according to the first aspect of the invention; and
(b) from 70 to 99.99 parts of a liquid medium;
wherein all parts are by weight.

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 80 to 99.9, more preferably from 85 to 99.5 and especially from 95 to 99 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The inks may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

Preferred liquid media include water, a mixture of water and organic solvent and organic solvent free from water. Preferably the liquid medium comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example ethylene glycol, propylene glycol, butylene glycol, pentylene glycol, hexylene glycol and thiodiglycol and oligo- and polyalkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethylene glycol monoallyl ether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethylene glycol, thiodiglycol, diethylene glycol and triethylene glycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

When the liquid medium comprises organic solvent free from water, (i.e. less than 1% water by weight) the solvent preferably has a boiling point of from 30 to 200° C., more preferably of from 40 to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the mixture of phthalocyanine dyes in the liquid medium. Examples of polar solvents include $C_{1-4}$-alcohols.

In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is organic solvent free from water it is a mixture of 2 to 5 different organic solvents. This allows a liquid medium to be selected that gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties.

It is preferred that the composition according to the invention is ink suitable for use in an ink-jet printer. Ink suitable for use in an ink-jet printer is ink which is able to repeatedly fire through an ink-jet printing head without causing blockage of the fine nozzles. To do this the ink must be particle free, stable (i.e. not precipitate on storage), free from corrosive elements (e.g. chloride) and have a viscosity which allows for good droplet formation at the print head.

Ink suitable for use in an ink-jet printer preferably has a viscosity of less than 20 cP, more preferably less than 10 cP, especially less than 5 cP, at 25° C.

Ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colorant or additive incorporated in the ink).

Preferably ink suitable for use in an ink-jet printer has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably ink suitable for use in an ink-jet printer contains less than 500 ppm, more preferably less than 250 ppm, especially less than 100 ppm, more especially less than 10 ppm in total of halide ions.

A third aspect of the invention provides a process for forming an image on a substrate comprising applying a composition, preferably ink suitable for use in an ink-jet printer, according to the second aspect of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Photographic quality papers are especially preferred.

A fourth aspect of the present invention provides a material preferably paper, plastic, a textile, metal or glass, more preferably paper, an overhead projector slide or a textile material, especially paper more especially plain, coated or treated papers printed with azaphthalocyanine compounds as described in the first aspect of the invention, a composition according to the second aspect of the invention or by means of a process according to the third aspect of the invention.

It is especially preferred that the printed material of the fourth aspect of the invention is a print on a photographic quality paper printed using a process according to the third aspect of the invention.

A fifth aspect of the present invention provides an ink-jet printer cartridge comprising a chamber and a composition, preferably ink suitable for use in an ink-jet printer, wherein the composition is in the chamber and the composition is as defined and preferred in the second aspect of the present invention. The cartridge may contain a high concentration ink and a low concentration ink, as described in the second aspect of the invention, in different chambers.

The invention is further illustrated by the following Examples in which all parts and percentages are by weight unless otherwise stated.

Preparation of the Phthalocyanine Intermediates
Preparation of Phthalonitrile A

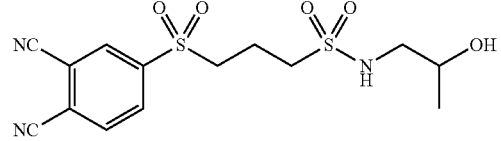 [SMILES: CC(O)CNS(=O)(=O)CCCS(=O)(=O)c1ccc(C#N)c(C#N)c1]

Phthalonitrile A corresponds to compound 8 in U.S. Pat. No. 7,211,134, which is incorporated herein by reference, and was prepared as described therein.

Preparation of Phthalonitrile B

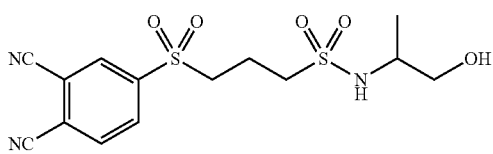 [SMILES: CC(CO)NS(=O)(=O)CCCS(=O)(=O)c1ccc(C#N)c(C#N)c1]

Phthalonitrile B was prepared as phthalonitrile A except that 2-amino-1-propanol was used in place of 1-amino-2-propanol.

Preparation of Phthalonitrile C

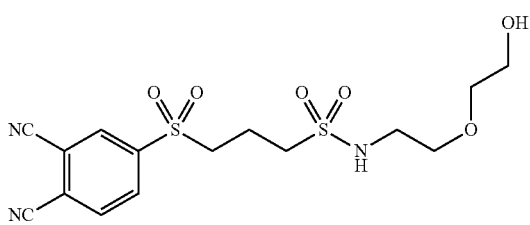 [SMILES: N#Cc1ccc(S(=O)(=O)CCCS(=O)(=O)NCCOCCO)cc1C#N]

Phthalonitrile B was prepared as phthalonitrile A except that aminoethoxyethanol was used in place of 1-amino-2-propanol.

Preparation of Phthalonitrile D

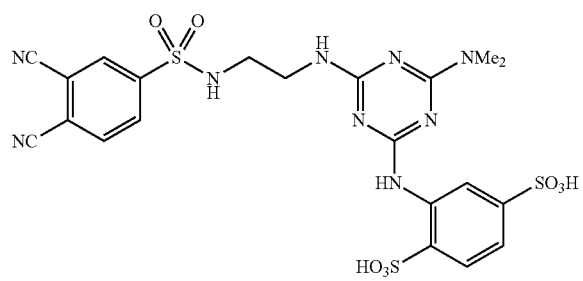 [SMILES: CN(C)c1nc(NCCNS(=O)(=O)c2ccc(C#N)c(C#N)c2)nc(Nc2cc(S(=O)(=O)O)ccc2S(=O)(=O)O)n1]

Stage 1
Preparation of Compound A

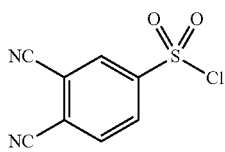 [SMILES: N#Cc1ccc(S(=O)(=O)Cl)cc1C#N]

Compound A was prepared as described in Phosphorus, Sulfur and Silicon, 1995, 101, 161-167 which is incorporated herein by reference.

Stage 2
Preparation of Compound B

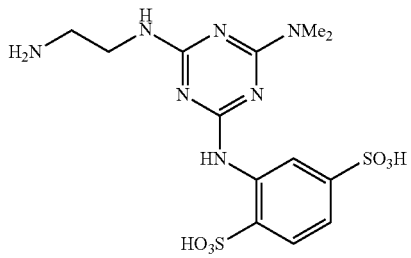 [SMILES: CN(C)c1nc(NCCN)nc(Nc2cc(S(=O)(=O)O)ccc2S(=O)(=O)O)n1]

Cyanuric chloride (9.23 g) was stirred in ice/water (2000 g) containing a few drops of calsolene oil at 0-5° C. A solution of 2,5-disulphoaniline (13.8 g) in water (50 ml) at pH 5 to 6 was then added drop wise with stirring. The reaction mixture was stirred at ≤5° C. and pH 5 to 6 for 2 hours. The pH was then raised to 7 with 2M sodium hydroxide solution and the temperature to 20-25° C. and the reaction mixture was left for 1 hour. Dimethylamine (40%, 6.3 ml) was then added and the pH was adjusted to 8.5 to 9. The reaction mixture was stirred at room temperature and pH 8.5-9 for 2 hours, then at pH 8.5-9, 60° C. for 1 hour and for a further 1 hour at 80° C. before being allowed to cool overnight. The next day ethylenediamine (33 ml) was added to the mixture and the reaction was stirred at 80° C. for a further 2 hours. The volume of the reaction mixture was reduced to 200 ml using a rotary evaporator, NaCl (20 g) was added and the pH was lowered to 1 with concentrated HCl. The precipitate which formed was collected by filtration, washed with 20% NaCl and slurried in methanol (170 ml) and water (9 ml) at 60° C. for 1 hour. The solid was then collected by filtration, washed with methanol (25 ml) and dried to give the product (18.5 g).

Stage 3
Preparation of the Title Phthalonitrile

Compound B (20 g) was dissolved in water (200 ml) by the addition of 2M sodium carbonate solution to pH8. Compound A (9.97 g) was added and the pH was adjusted to 8.5 with 2M sodium carbonate. The reaction mixture was stirred room temperature overnight and the precipitated solid filtered off, washed with propan-2-ol and dried to give the 25.51 g of phthalonitrile D.

Phthalonitrile E

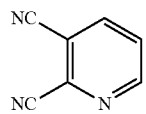

This compound is commercially available.

Phthalonitrile F

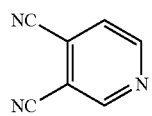

This compound is commercially available.

Phthalonitrile G

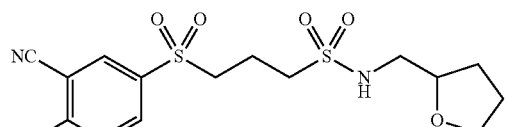

Phthalonitrile G was prepared as phthalonitrile A except that tetrahydrofurfurylamine was used in place of 1-amino-2-propanol.

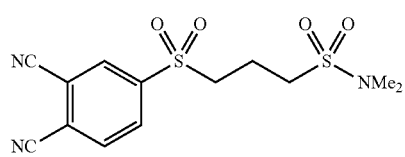 [SMILES: CN(C)S(=O)(=O)CCCS(=O)(=O)c1ccc(C#N)c(C#N)c1]

Phthalonitrile H

Phthalonitrile H was prepared as phthalonitrile A except that dimethylamine was used in place of 1-amino-2-propanol.

Phthalonitrile I

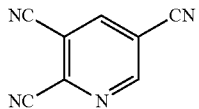 [SMILES: N#Cc1cnc(C#N)c(C#N)c1]

Stage 1

Potassium permanganate (125.8 g) was add over 3 hours to a suspension of 2,3,5-collidine (12.1 g) in water (120 ml) at 70° C. The reaction was stirred at room temperature for 14 hours, filtered, the filtrate was acidified with cHCl to pH 3 and the precipitated solid filtered off, washed with first methanol (20 ml) and then acetone and dried to give 2,3,5-tricarboxy-pyridine (7.2 g).

Stage 2

2,3,5-Tricarboxypyridine (5.9 g), prepared as in stage 1, was added portion-wise to thionyl chloride (30 ml) at <20° C. The mixture was heated under refluxed for 14 hours. The reaction mixture was then cooled and acetonitrile (50 ml) was added, insoluble material was filtered off and the filtrate was evaporated to give pyridine-2,3,5-tricarbonychloride (4.4 g). The pyridine-2,3,5-tricarbonychloride was dissolved in acetonitrile (20 ml), added to a concentrated ammonia solution (56 ml) and heated at 50-60° C. for 1.5 hours and then at room temperature for 14 hours. The resultant precipitate was filtered off, dried and added to thionyl chloride (25 ml) and then heated at 75° C. for 18 hours. The reaction mixture was cooled and any excess thionyl chloride distilled off. Acetonitrile (30 ml) was then added to the reaction mixture and the precipitate was filtered off, washed with acetonitrile (20 ml) and dichloromethane (10 ml) and dried at room temperature. This solid was added to concentrated ammonia solution (50 ml) and the resultant suspension was stirred at 50° C. for 4 hours, cooled and the solid was separated by filtration and dried to give pyridine-2,3,5-tricarbonamide (1.9 g).

Stage 3

Trifluoroacetic anhydride (10.3 ml) was added to pyridine-2,3,5-tricarbonamide (4.16 g) (from stage 2) in 1,4-dioxane (26 ml) and pyridine (8 ml) at 0° C. The reaction was then stirred at room temperature for 14 hours. At the end of this time the reaction mixture was drowned into water (75 ml), filtered and filtrate extracted with ethyl acetate. Organic extracts were washed with water (100 ml), dried with anhydrous magnesium sulphate and evaporated to give an oil. The oil was stirred with water (50 ml) and then the water was decanted to yield a semi-solid which was dissolved in dichloromethane, dried with anhydrous magnesium sulphate, filtered and evaporated to dryness to give phthalonitrile I (1.3 g.)

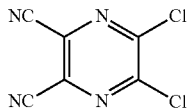

Phthalonitrile J

This compound is commercially available.

Phthalonitrile K

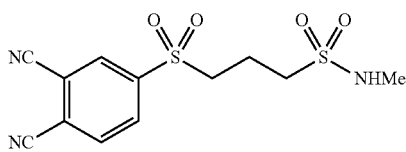 [SMILES: CNS(=O)(=O)CCCS(=O)(=O)c1ccc(C#N)c(C#N)c1]

Phthalonitrile K was prepared as phthalonitrile A except that methylamine was used in place of 1-amino-2-propanol.

Phthalonitrile L

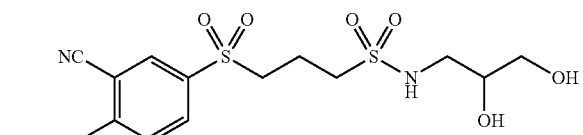

Phthalonitrile L was prepared as phthalonitrile A except that 2,2-dimethyl-1,3-dioxolane-4-methanamine was used in place of 1-amino-2-propanol and the protecting group was removed by heating the sample in water with a few drops of cHCl for 2 hours, cooling, filtering off the precipitated product, washing with water and drying.

Phthalonitrile M

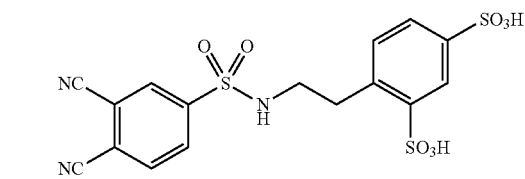 [SMILES: N#Cc1ccc(S(=O)(=O)NCCc2ccc(S(=O)(=O)O)cc2S(=O)(=O)O)cc1C#N]

Phthalonitrile M was prepared as phthalonitrile D except that 2-amino-2,4-disulphophenyethylamine was used in place of Compound B.

Phthalonitrile N

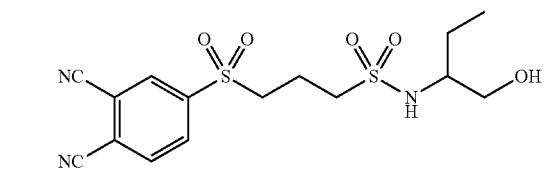 [SMILES: CCC(CO)NS(=O)(=O)CCCS(=O)(=O)c1ccc(C#N)c(C#N)c1]

Phthalonitrile N was prepared as phthalonitrile A except that 2-amino-1-butanol was used in place of 1-amino-2-propanol.

Phthalonitrile O

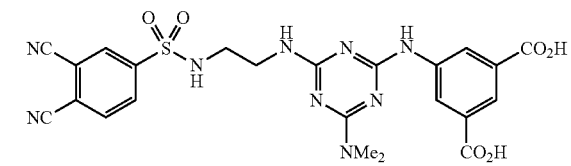 [SMILES: CN(C)c1nc(NCCNS(=O)(=O)c2ccc(C#N)c(C#N)c2)nc(Nc2cc(C(=O)O)cc(C(=O)O)c2)n1]

Phthalonitrile O was prepared as phthalonitrile D except that aminoisophthalic acid was used in place of 2,5-disulphoaniline in the preparation of Compound B.

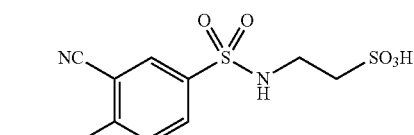

Phthalonitrile P

Phthalonitrile P was prepared as phthalonitrile D except that taurine was used in place of Compound B.

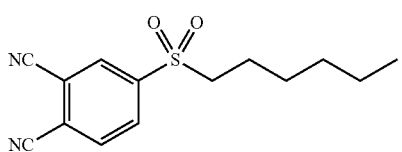 [SMILES: CCCCCCS(=O)(=O)c1ccc(C#N)c(C#N)c1]

Phthalonitrile Q

Phthalonitrile Q was prepared as compound 1 in U.S. Pat. No. 7,211,134, except that 1-hexanethiol was used in place of mercaptopropanesulphonic acid.

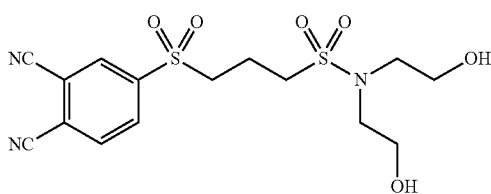 [SMILES: N#Cc1ccc(S(=O)(=O)CCCS(=O)(=O)N(CCO)CCO)cc1C#N]

Phthalonitrile R

Phthalonitrile R was prepared as phthalonitrile A except that diethanolamine was used in place of 1-amino-2-propanol.

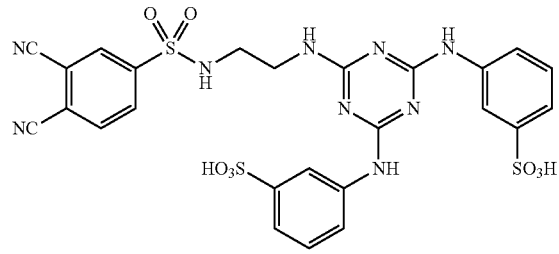 [SMILES: N#Cc1ccc(S(=O)(=O)NCCNc2nc(Nc3cccc(S(=O)(=O)O)c3)nc(Nc3cccc(S(=O)(=O)O)c3)n2)cc1C#N]

Phthalonitrile S

Phthalonitrile S was prepared as phthalonitrile D except that metanillic acid was used in place of dimethylamine and 2,5-disulphoaniline in the preparation of Compound B.

Phthalonitrile T

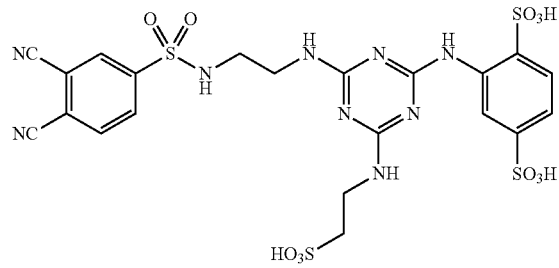 [SMILES: N#Cc1ccc(S(=O)(=O)NCCNc2nc(NCCS(=O)(=O)O)nc(Nc3cc(S(=O)(=O)O)ccc3S(=O)(=O)O)n2)cc1C#N]

Phthalonitrile T was prepared as phthalonitrile D except that 4-sulphoanthranillic acid was used in place of 2,5-disulphoaniline and taurine in place of dimethylamine in the preparation of Compound B.

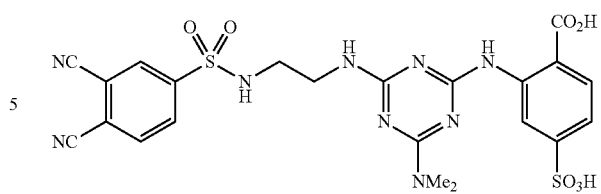

Phthalonitrile U

Phthalonitrile U was prepared as phthalonitrile D except that 4-sulphoanthranillic acid was used in place 2,5-disulphoaniline in the preparation of Compound B.

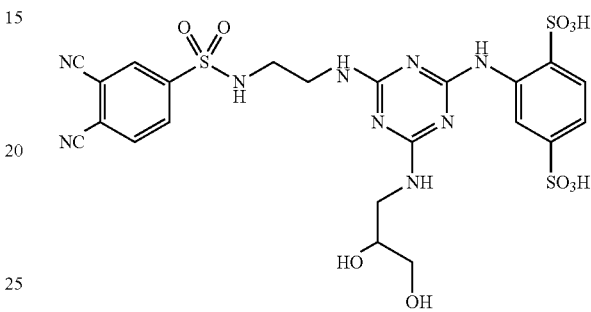

Phthalonitrile V

Phthalonitrile V was prepared as phthalonitrile D except that 3-amino-1,2-propanediol was used in place of dimethylamine in the preparation of Compound B.

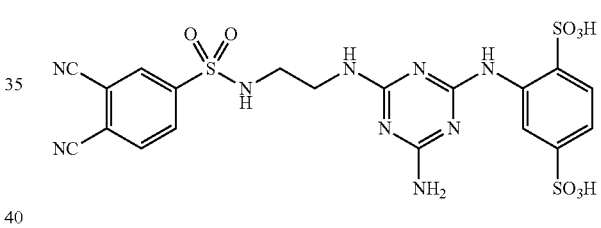

Phthalonitrile W

Phthalonitrile W was prepared as phthalonitrile D except that ammonia was used in place of dimethylamine in the preparation of Compound B.

Phthalonitrile X

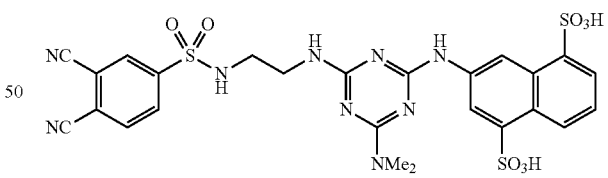

Phthalonitrile X was prepared as phthalonitrile D except that 2-amino-4,8-disulphonaphthalene was used in place of 2,5-disulphoaniline in the preparation of Compound B.

Phthalonitrile Y

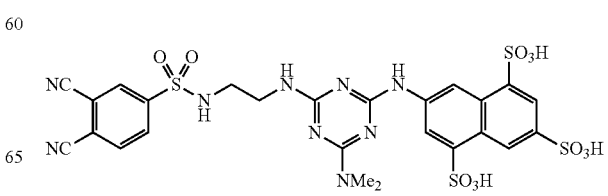

Phthalonitrile Y was prepared as phthalonitrile D except that 2-amino-4,6,8-trisulphonaphthalene was used in place of 2,5-disulphoaniline in the preparation of Compound B.

Phthalonitrile Z

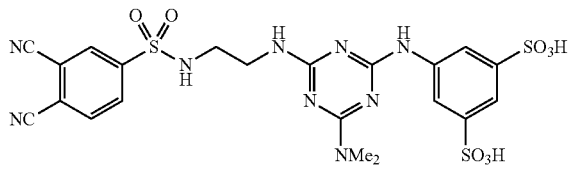 [SMILES: CN(C)c1nc(NCCNS(=O)(=O)c2ccc(C#N)c(C#N)c2)nc(Nc2cc(S(=O)(=O)O)cc(S(=O)(=O)O)c2)n1]

Phthalonitrile Z was prepared as phthalonitrile D except that 3,5-disulphoaniline was used in place of 2,5-disulphoaniline in the preparation of Compound B.

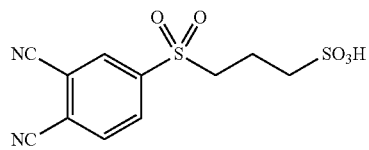 [SMILES: N#Cc1ccc(S(=O)(=O)CCCS(=O)(=O)O)cc1C#N]

Phthalonitrile AA

Phthalonitrile AA corresponds to compound 1 in U.S. Pat. No. 7,211,134 and was prepared as described therein.

EXAMPLE 1

Preparation of the Lithium Salt of a Mixture of Dyes Comprising a Compound of Formula

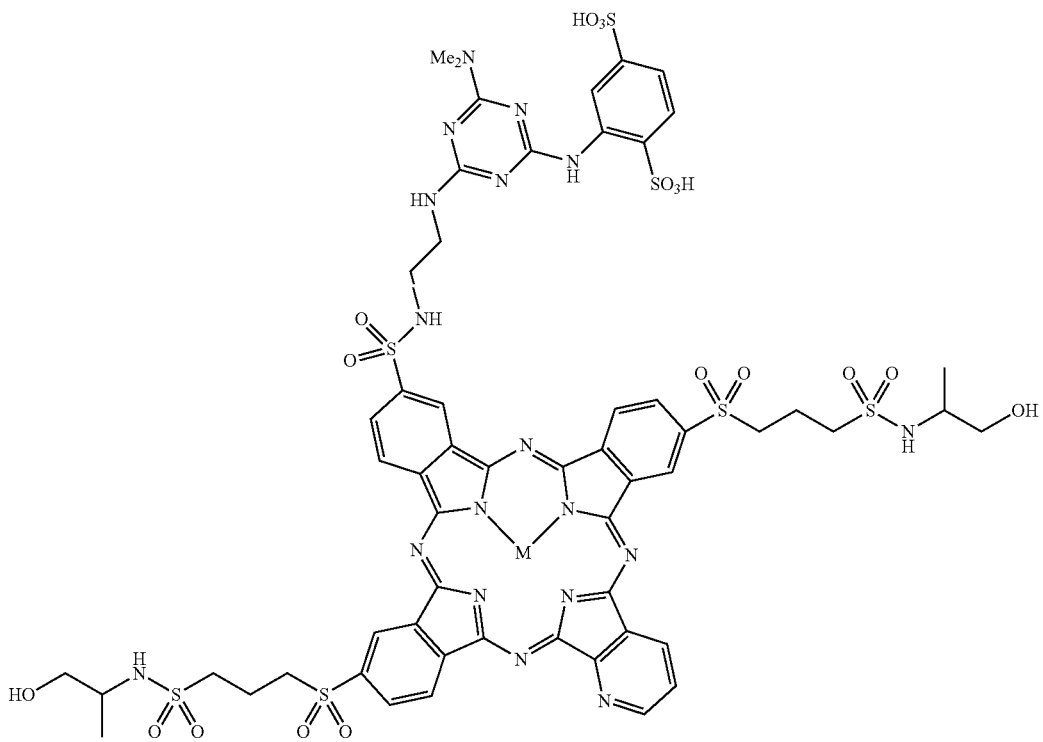

Phthalonitrile B (5.44 g), phthalonitrile D (4.96 g) and azaphthalonitrile E (0.94 g) were dissolved in diethylene glycol (18 g) and acetic acid (0.22 g) by heating to 120° C. and then cooling to 70° C. Triethylorthoacetate (2.92 g), copper (II) chloride (0.99 g) and lithium acetate (0.5 g) were then added and the reaction was heated to 120° C. for 4 hours. The reaction mixture was cooled to 70° C. and ethylenediaminetetraacetic acid (0.4 g) and concentrated hydrochloric acid (3 ml) were added and the mixture was heated at 80° C. for 1 hour. Propan-2-ol (60 ml) was then added and the precipitate which formed was filtered off and washed with propan-2-ol (60 ml). This solid was then stirred at reflux in a mixture of propan-2-ol (70 ml) and water (10 ml) for 30 minutes, filtered-off, washed with propan-2-ol (60 ml) and dried. The solid was dissolved in water (200 ml), raised to pH8 with 2M lithium hydroxide, dialysed, filtered and dried to give a solid. (4.75 g).

EXAMPLE 2
Preparation of the Lithium Salt of a Mixture of Dyes Comprising a Compound of Formula
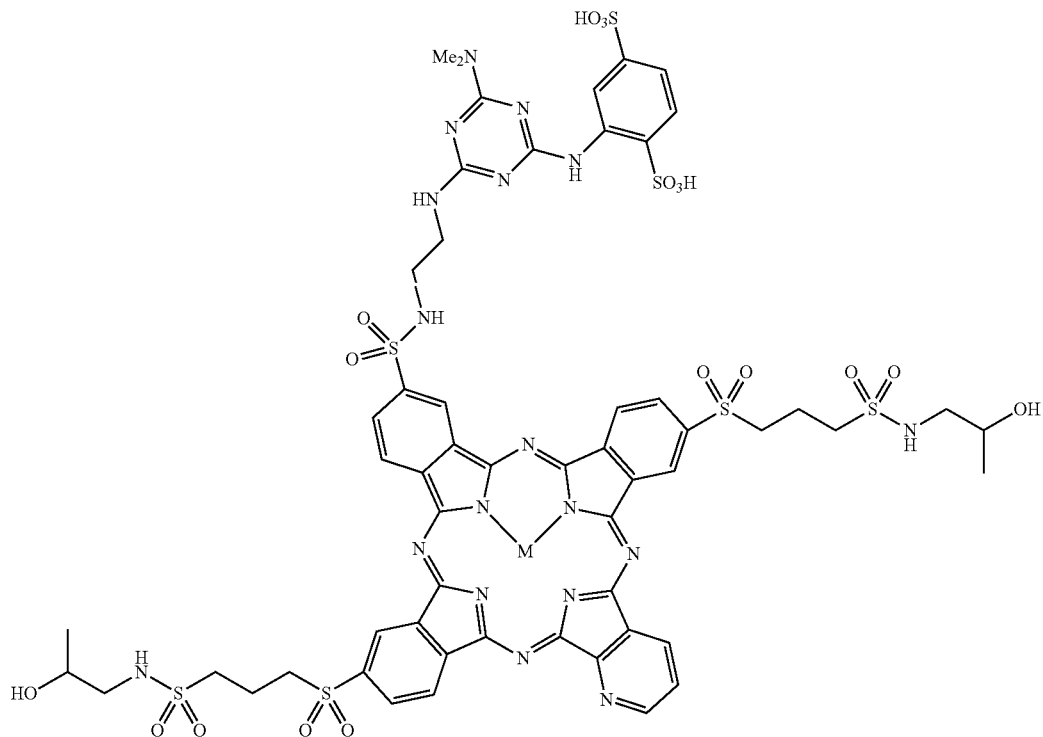
Prepared as in Example 1 except that phthalonitrile A (3.7 g), phthalonitrile D (3.4 g) and azaphthalonitrile E (0.65 g) were used to give a 6 g of a solid product.
EXAMPLE 3
Preparation of the Lithium Salt of a Mixture of Dyes Comprising a Compound of Formula
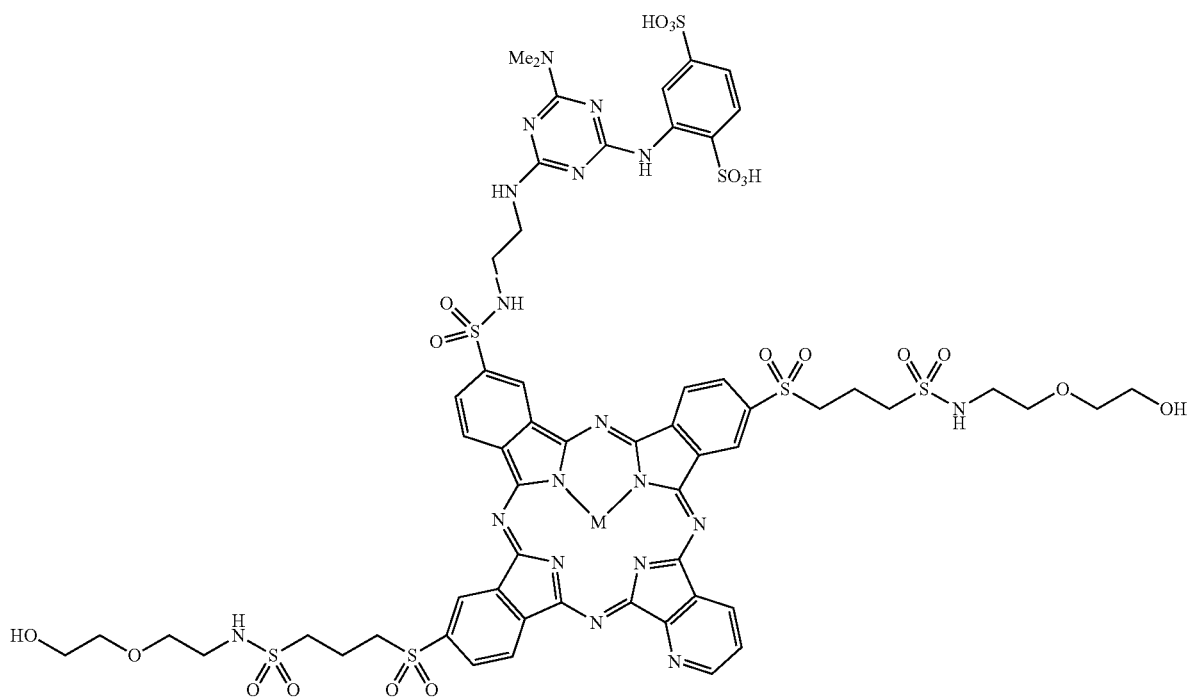

Prepared as in Example 1 except phthalonitrile C (6.1 g), phthalonitrile D (5 g) and azaphthalonitrile C (0.96 g) were used to give 7.67 g of product.

| Example | Azaph-thalo-nitrile | Mol eq | Sulphone Phthalo-nitrile | Mol eq | Sulphonamide Phthalo-nitrile | Mol eq |
|---|---|---|---|---|---|---|
| 1 | E | 1 | B | 2 | D | 1 |
| 2 | E | 1 | A | 2 | D | 1 |
| 3 | E | 1 | C | 2 | D | 1 |
| 4 | F | 1.5 | B | 1.5 | D | 1 |
| 5 | E | 1.5 | B | 1.5 | D | 1 |
| 6 | E | 1.5 | B | 1.75 | D | 0.75 |
| 7 | E | 1.5 | B | 2.0 | D | 0.5 |
| 8 | E | 1.5 | A | 1.5 | D | 1 |
| 9 | F | 1.5 | A | 1.5 | D | 1 |
| 10 | F | 1 | A | 2 | D | 1 |
| 11 | E | 1.5 | C | 1.75 | D | 0.75 |
| 12 | E | 1 | B | 1 | P | 2 |
| 13 | E | 1 | C | 2.5 | D | 0.5 |
| 14 | E | 1 | A | 2.5 | D | 0.5 |
| 15 | E | 1 | H | 2 | D | 1 |
| 16 | E | 1 | K | 2 | D | 1 |
| 17 | E | 1 | B | 2.5 | D | 0.5 |
| 18 | E | 1 | H | 2.5 | D | 0.5 |
| 19 | E | 1 | J | 2.5 | D | 0.5 |
| 20 | E | 1 | L | 2.5 | D | 0.5 |
| 21 | E | 1 | A | 1 | M | 2 |
| 22 | E | 1 | N | 2 | D | 1 |
| 23 | E | 1 | N | 2.5 | D | 0.5 |
| 24 | E | 1 | A | 2 | S | 1 |
| 25 | E | 1 | B | 2 | T | 1 |
| 26 | E | 1 | B | 2 | U | 1 |
| 27 | E | 1 | Q | 2 | D | 1 |
| 28 | E | 1 | R | 2 | D | 1 |
| 29 | E | 1 | B | 2.25 | D | 0.75 |
| 30 | E | 1 | B | 2 | S | 1 |
| 31 | E | 1.25 | B | 1.75 | D | 1 |
| 32 | E | 1 | B | 2 | V | 1 |
| 33 | E | 1 | A | 2 | V | 1 |
| 34 | E | 1 | B | 2 | W | 1 |
| 35 | E | 1 | A | 2 | W | 1 |
| 36 | E | 1 | A | 2 | T | 1 |
| 37 | E | 1 | B | 2 | X | 1 |
| 38 | E | 1 | B | 2 | Y | 1 |
| 39 | E | 1 | B | 2 | Z | 1 |
| 40 | J | 1 | B | 2 | D | 1 |
| 41 | E | 1 | G | 2 | D | 1 |
| 42 | E | 1 | G | 2.25 | D | 0.75 |
| 43 | I | 1 | B | 2 | D | 1 |
| 44 | E | 1 | A | 2 | O | 1 |

COMPARATIVE EXAMPLES

| Example | Azaph-thalo-nitrile | Mol eq | Sulphonamide Phthalo-nitrile | Mol eq | Sulphone Phthalo-nitrile | Mol eq |
|---|---|---|---|---|---|---|
| Comparative Example 1 | E | 1 | P | 3 | | |
| Comparative Example 2 | E | 1 | | | AA | 3 |
| Comparative Example 3 | F | 1 | | | AA | 3 |
| Comparative Example 4 | A | 1 | | | AA | 3 |

EXAMPLE 45

Preparation of Inks

Ink were prepared by dissolving 3.5 g of the dye of Examples 1 and 13 and Comparative Examples 1 to 4 in 96.5 g of a liquid medium comprising:
Diethylene glycol 7%
Ethylene glycol 7%
2-Pyrollidone 7%
Surfynol™ 465 1%
Tris buffer 0.2%
Water 77.8% (all % by weight)
and adjusting the pH of the ink to 8-8.5 using lithium hydroxide.
Surfynol® 465 is a surfactant from Air Products.

EXAMPLE 5

Ink-Jet Printing

Ink prepared as described above are filtered through a 0.45 micron nylon filter and then incorporated into empty print cartridges using a syringe.

These inks were then ink-jet printed on to the following ink-jet media at 50% depth:
Epson Ultra Premium Glossy Photo Paper (SEC PM);
Canon Premium PR101 Photo Paper (PR101); and
HP Advanced Photo Paper (HPP).

The prints were tested for ozone fastness by exposure to 1 ppm ozone at 40° C., 50% relative humidity for 24 hours in a Hampden 903 Ozone cabinet. Fastness of the printed ink to ozone was judged by the difference in the optical density before and after exposure to ozone.

Light-fastness of the printed image was assessed by fading the printed image in an Atlas® Ci5000 Weatherometer for 100 hours and then measuring the change in the optical density.

Optical density measurements were performed using a Gretag® Spectrolino spectrophotometer set to the following parameters:
Measuring Geometry: 0°/45°
Spectral Range: 380-730 nm
Spectral Interval: 10 nm
Illuminant: D65
Observer: 2° (CIE 1931)
Density: Ansi A
External Filler: None Light and Ozone fastness were assessed by the percentage change in the optical density of the print, where a lower figure indicates higher fastness, and the degree of fade.

Ozone Fastness

| Dye | SUBSTRATE | ROD LOSS % |
|---|---|---|
| Comparative Example 1 | HPP | 19 |
| | PR101 | 38 |
| | SEC PM | 11 |
| Comparative Example 2 | HPP | 12 |
| | PR101 | 16 |
| | SEC PM | 8 |
| Comparative Example 3 | HPP | 14 |
| | PR101 | 23 |
| | SEC PM | 7 |
| Comparative Example 4 | HPP | 14 |
| | PR101 | 19 |
| | SEC PM | 9 |

-continued

| Dye | SUBSTRATE | ROD LOSS % |
|---|---|---|
| Example 1 | HPP | 7 |
|  | PR101 | 14 |
|  | SEC PM | 7 |
| Example 13 | HPP | 5 |
|  | PR101 | 6 |
|  | SEC PM | 3 |

Light Fastness

| Dye | SUBSTRATE | ROD LOSS % |
|---|---|---|
| Comparative Example 1 | HPP | 19 |
|  | PR101 | 25 |
|  | SEC PM | 10 |
| Comparative Example 2 | HPP | 19 |
|  | PR101 | 10 |
|  | SEC PM | 11 |
| Comparative Example 3 | HPP | 21 |
|  | PR101 | 17 |
|  | SEC PM | 13 |
| Comparative Example 4 | HPP | 18 |
|  | PR101 | 15 |
|  | SEC PM | 10 |
| Example 1 | HPP | 10 |
|  | PR101 | 12 |
|  | SEC PM | 11 |
| Example 13 | HPP | 7 |
|  | PR101 | 6 |
|  | SEC PM | 5 |

Further Inks

The inks described in Tables A and B may be prepared using the compound of Example 1. The dye indicated in the first column is dissolved in 100 parts of the ink as specified in the second column on. Numbers quoted in the second column onwards refer to the number of parts of the relevant ink ingredient and all parts are by weight. The pH of the ink may be adjusted using a suitable acid or base. The inks may be applied to a substrate by ink-jet printing.

The following abbreviations are used in Tables A and B:
PG=propylene glycol
DEG=diethylene glycol
NMP=N-methylpyrrolidone
DMK=dimethylketone
IPA=isopropanol
2P=2-pyrrolidone
MIBK=methylisobutyl ketone
P12=propane-1,2-diol
BDL=butane-2,3-diol
TBT=tertiary butanol

TABLE A

| Dye | Water | PG | DEG | NMP | DMK | IPA | 2P | MIBK |
|---|---|---|---|---|---|---|---|---|
| 2.0 | 80 | 5 |  | 6 | 4 |  | 5 |  |
| 3.0 | 90 |  | 5 | 5 |  |  |  |  |
| 10.0 | 85 | 3 |  | 3 | 3 |  | 6 |  |
| 2.1 | 91 |  | 8 |  |  |  |  | 1 |
| 3.1 | 86 | 5 |  |  | 4 |  |  | 5 |
| 1.1 | 81 |  |  | 9 |  | 10 |  |  |
| 2.5 | 60 | 4 | 15 | 3 | 3 | 6 | 5 | 4 |
| 5 | 65 |  | 20 |  |  | 10 | 5 |  |
| 2.4 | 75 | 5 | 10 |  | 5 |  |  | 5 |
| 4.1 | 80 | 3 | 5 | 2 | 10 |  |  |  |
| 3.2 | 65 |  | 5 | 4 | 6 | 5 | 10 | 5 |
| 5.1 | 96 |  |  |  |  | 4 |  |  |
| 10.8 | 90 | 5 |  |  | 5 |  |  |  |

TABLE A-continued

| Dye | Water | PG | DEG | NMP | DMK | IPA | 2P | MIBK |
|---|---|---|---|---|---|---|---|---|
| 10.0 | 80 | 2 | 6 | 2 | 5 | 1 | 4 |  |
| 1.8 | 80 |  | 5 |  |  |  | 15 |  |
| 2.6 | 84 |  |  | 11 |  |  | 5 |  |
| 3.3 | 80 | 4 |  |  | 10 |  |  | 6 |
| 12.0 | 90 |  |  |  | 7 | 3 |  |  |
| 5.4 | 69 | 2 | 20 | 2 | 1 |  | 3 | 3 |
| 6.0 | 91 |  |  | 4 |  |  | 5 |  |

TABLE B

| Dye Content | Water | PG | DEG | NMP | TBT | BDL | PI2 |
|---|---|---|---|---|---|---|---|
| 3.0 | 80 | 20 |  |  |  |  |  |
| 9.0 | 90 |  |  | 5 |  |  | 5 |
| 1.5 | 85 | 5 | 5 |  | 5 |  |  |
| 2.5 | 90 |  | 6 | 4 |  |  |  |
| 3.1 | 82 | 4 | 8 |  |  |  | 6 |
| 0.9 | 85 |  | 10 |  |  | 5 |  |
| 8.0 | 90 |  | 5 | 5 |  |  |  |
| 4.0 | 70 |  | 10 | 4 |  | 5 | 11 |
| 2.2 | 75 | 10 | 10 | 3 |  | 2 |  |
| 10.0 | 91 |  |  | 9 |  |  |  |
| 9.0 | 76 |  | 9 | 7 | 3 | 5 |  |
| 5.0 | 78 | 5 | 11 |  |  | 6 |  |
| 5.4 | 86 |  |  |  | 7 | 7 |  |
| 2.1 | 70 | 5 | 10 | 5 | 5 | 5 |  |
| 2.0 | 90 |  | 10 |  |  |  |  |
| 2 | 88 |  | 12 |  |  |  |  |
| 5 | 78 |  |  | 5 |  | 7 | 10 |
| 8 | 70 | 2 | 20 | 8 |  |  |  |
| 10 | 80 | 10 | 10 |  |  |  |  |
| 10 | 80 |  | 20 |  |  |  |  |

The invention claimed is:

1. Azaphthalocyanine compounds of Formula (1) and salts thereof:

Formula (1)

$$MAzPc\begin{pmatrix}(SO_2R^3)_y\\(SO_2NR^1R^2)_z\end{pmatrix}$$

wherein:
MAzPc represents an azaphthalocyanine nucleus of formula

[structure shown]

M is 2H, Cu or Ni;
each P is independently CH or N;
$R^1$ is H or optionally substituted alkyl;

$R^2$ is H; optionally substituted $C_{1-4}$alkyl carrying 1 or 2 water solubilising groups selected from the group consisting of —SO$_3$H, —CO$_2$H and —PO$_3$H$_2$; optionally substituted $C_{1-4}$alkyl carrying an optionally substituted heteroaryl group; or optionally substituted $C_{1-4}$alkyl carrying an optionally substituted aryl group;

—SO$_2$R$^3$ is a group of Formula (5)

$$\text{—SO}_2\text{-L-SO}_2\text{NR}^{13}\text{R}^{14} \qquad \text{Formula (5)}$$

wherein:
$R^{13}$ is H or optionally substituted $C_{1-4}$alkyl;
$R^{14}$ is H or optionally substituted $C_{1-4}$alkyl; and
L is optionally substituted $C_{1-4}$alkylene;
y is greater than 0 and less than 4;
z is greater than 0 and less than 4; and
the sum of y+z is in the range of from 1 to 4;
provided that at least one P is N in any one of the four component rings of the azaphthalocyanine nucleus.

2. Azaphthalocyanine compounds of Formula (1) and salts thereof as claimed in claim 1 wherein M is Cu.

3. Azaphthalocyanine compounds of Formula (1) and salts thereof as claimed in claim 1 wherein $R^1$ is H or methyl.

4. Azaphthalocyanine compounds of Formula (1) and salts thereof as claimed in claim 1 wherein $R^2$ is optionally substituted $C_{1-4}$alkyl carrying an optionally substituted triazinyl where the triazinyl group or substituent thereof carries at least one water solubilising group selected from the group consisting of —SO$_3$H, —CO$_2$H and —PO$_3$H$_2$.

5. Azaphthalocyanine compounds of Formula (1) and salts thereof as claimed in claim 1 wherein $R^2$ is a group of Formula (4)

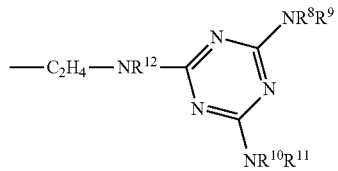

Formula (4)

wherein:
$R^8$ is H or optionally substituted $C_{1-4}$alkyl;
$R^9$ is H or optionally substituted $C_{1-4}$alkyl;
$R^{10}$ is H or optionally substituted $C_{1-4}$alkyl;
$R^{11}$ is optionally substituted alkyl, optionally substituted aryl or optionally substituted heterocyclyl carrying at least one substituent selected from the group consisting of —SO$_3$H, —CO$_2$H and —PO$_3$H$_2$; and
$R^{12}$ is H or optionally substituted $C_{1-4}$ alkyl.

6. Azaphthalocyanine compounds of Formula (1) and salts thereof as claimed in claim 5 wherein $R^{11}$ is an aryl group carrying 1 to 3 —SO$_3$H or —CO$_2$H groups.

7. Azaphthalocyanine compounds of Formula (1) and salts thereof as claimed in claim 1 wherein $R^{14}$ is $C_{1-4}$alkyl carrying at least one substituent selected from the group consisting of —OH, —SO$_3$H, —CO$_2$H and —PO$_3$H$_2$.

8. Azaphthalocyanine compounds of Formula (1) and salts thereof as claimed in claim 1 which are obtained by a process which comprises a cyclisation step wherein an azaphthalonitrile is reacted with a phthalonitrile carrying —SO2NR1R2 substituent and a phthalonitrile carrying a —SO$_2$R$^3$ substituent, wherein $R^1$, $R^2$ and $R^3$ are as defined in claim 1.

9. A composition comprising azaphthalocyanine compounds of Formula (1) and salts thereof as described in claim 1 and a liquid medium.

10. A process for forming an image on a substrate comprising applying a composition, as described in claim 9, thereto by means of an ink-jet printer.

11. A material printed with azaphthalocyanine compounds as described in claim 1.

12. An ink-jet printer cartridge comprising a chamber and composition as described in claim 9, wherein the composition is in the chamber.

* * * * *